United States Patent [19]
Radek

[11] 3,957,159
[45] May 18, 1976

[54] ROTARY STORAGE UNIT

[75] Inventor: John R. Radek, Hinsdale, Ill.

[73] Assignee: Ready Metal Manufacturing Co., Chicago, Ill.

[22] Filed: Nov. 26, 1973

[21] Appl. No.: 418,835

Related U.S. Application Data

[62] Division of Ser. No. 240,163, March 31, 1972, Pat. No. 3,807,788.

[52] U.S. Cl. .................................... 211/4; 211/78; 211/131; 211/163; 312/216
[51] Int. Cl.² ...................... E05B 73/00; A47F 5/02
[58] Field of Search .................. 74/512; 211/4–9, 211/181, 70, 77, 78, 128, 129, 131, 144, 163, 164, 166, 176, 53, 56, 58, 95, 115; 108/106–110; 312/135, 197, 202, 216–221

[56] References Cited
UNITED STATES PATENTS

| | | | |
|---|---|---|---|
| 144,924 | 11/1873 | Randolph | 211/129 |
| 514,771 | 2/1894 | Priest | 312/220 |
| 867,996 | 10/1907 | McMillan | 211/8 |
| 971,389 | 9/1910 | Malone | 211/163 UX |
| 1,449,065 | 3/1923 | Smith | 211/78 |
| 1,635,201 | 7/1927 | Bell et al | 211/131 |
| 1,977,400 | 10/1934 | Offery et al | 211/78 X |
| 2,033,433 | 3/1936 | Leupold | 74/512 |
| 2,121,711 | 6/1938 | Patt | 211/77 |
| 2,678,253 | 5/1954 | Rosenberg | 211/131 X |
| 2,750,051 | 5/1956 | Wassell | 211/78 X |
| 3,073,431 | 1/1963 | Davis et al. | 211/131 X |
| 3,371,974 | 3/1968 | Vermeersch | 312/218 |
| 3,641,950 | 2/1972 | Axhamre | 108/109 |
| 3,674,156 | 7/1972 | Krebs | 211/4 |
| 3,685,664 | 8/1972 | Kramer | 211/131 |
| 3,705,654 | 12/1972 | Barrineau | 211/176 |
| D85,303 | 10/1931 | Peterson | 211/78 UX |

FOREIGN PATENTS OR APPLICATIONS

| | | | |
|---|---|---|---|
| 359,328 | 1/1906 | France | 211/144 |
| 90,752 | 1/1958 | Norway | 211/144 |

Primary Examiner—Roy D. Frazier
Assistant Examiner—Lawrence J. Staab
Attorney, Agent, or Firm—Frank H. Marks

[57] ABSTRACT

A rotary storage and dispensing unit for various small items, especially designed for installation in a service van such as a panel truck, but eminently suitable for use in other environments, such as a retail store, service station or elsewhere. The unit, preferably of skeletal knockdown construction, has a frame mounted for rotation on a vertical axis and provides a plurality of triangular chambers each housing vertically stacked containers that may be detachably locked on the frame. The frame may be indexed in desired angular position, the indexing means including a dual control lever operable from laterally spaced positions.

8 Claims, 32 Drawing Figures

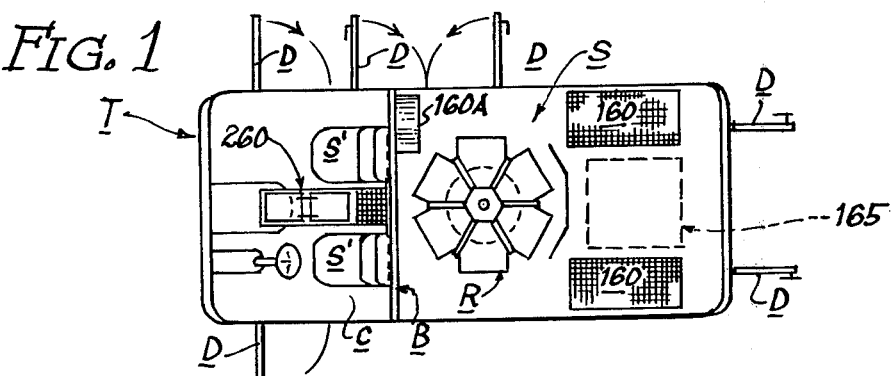
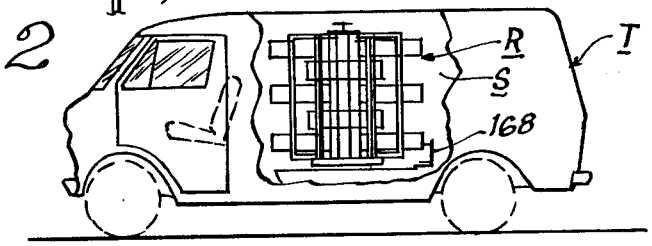
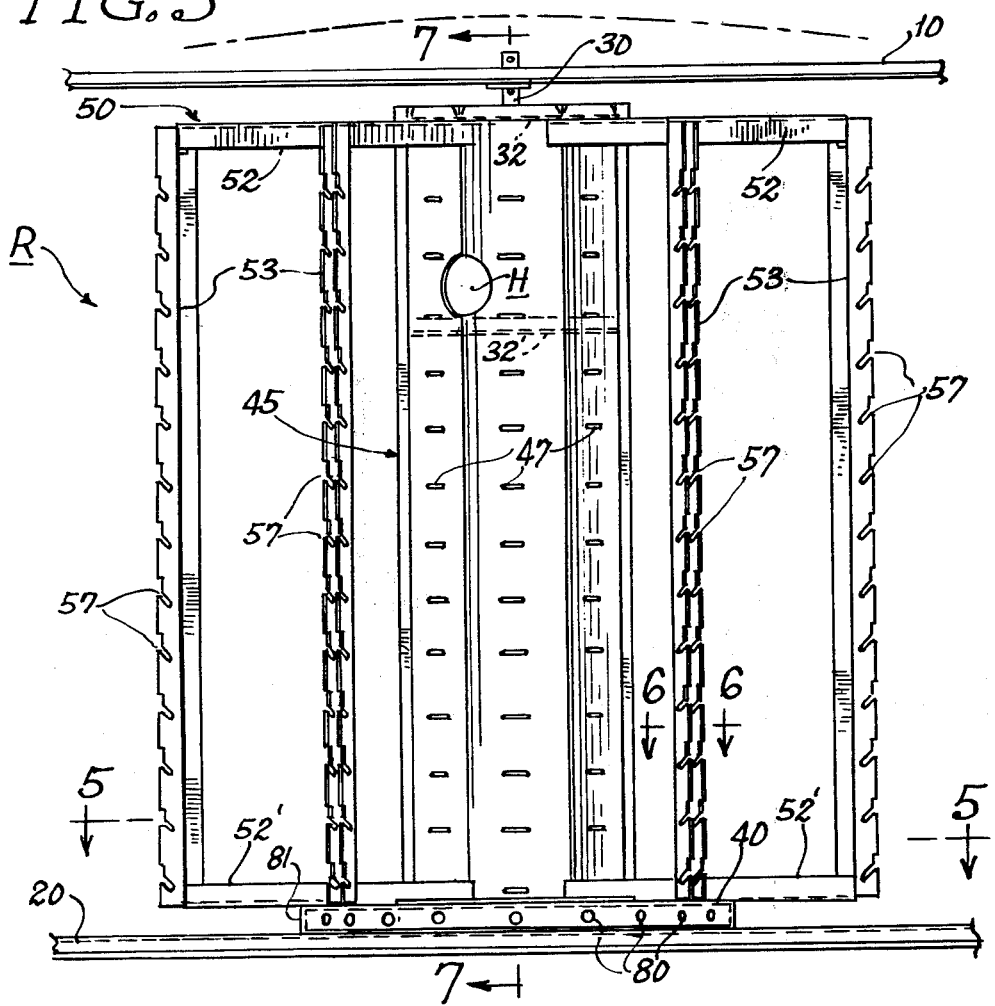

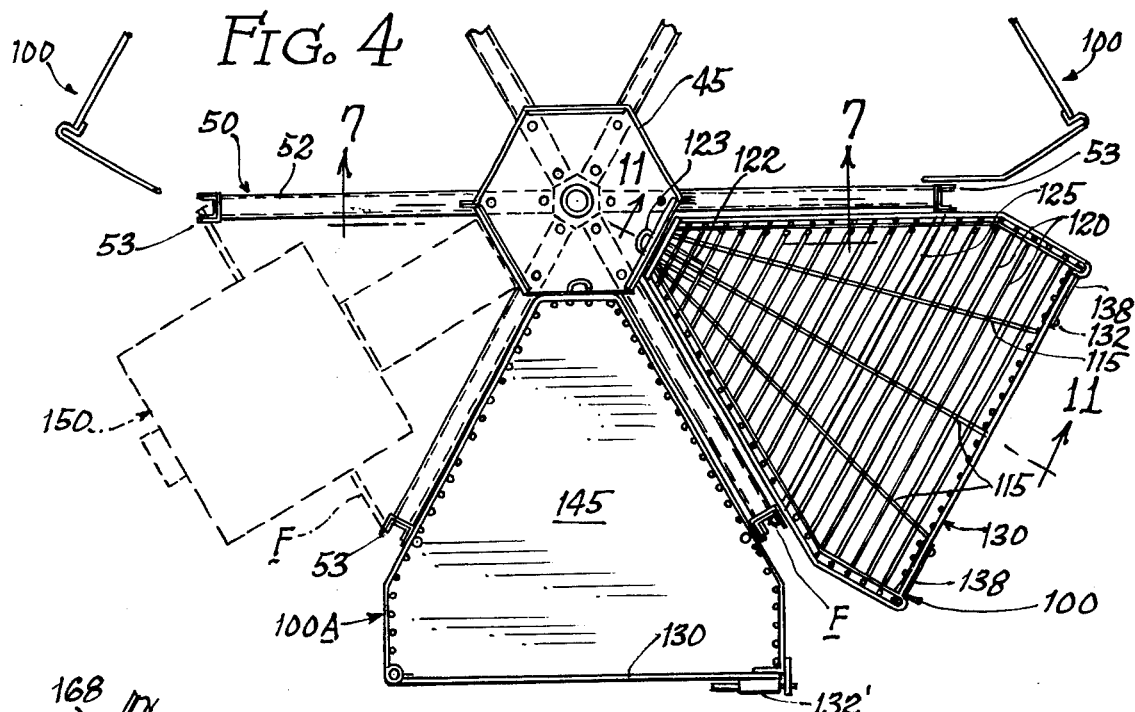
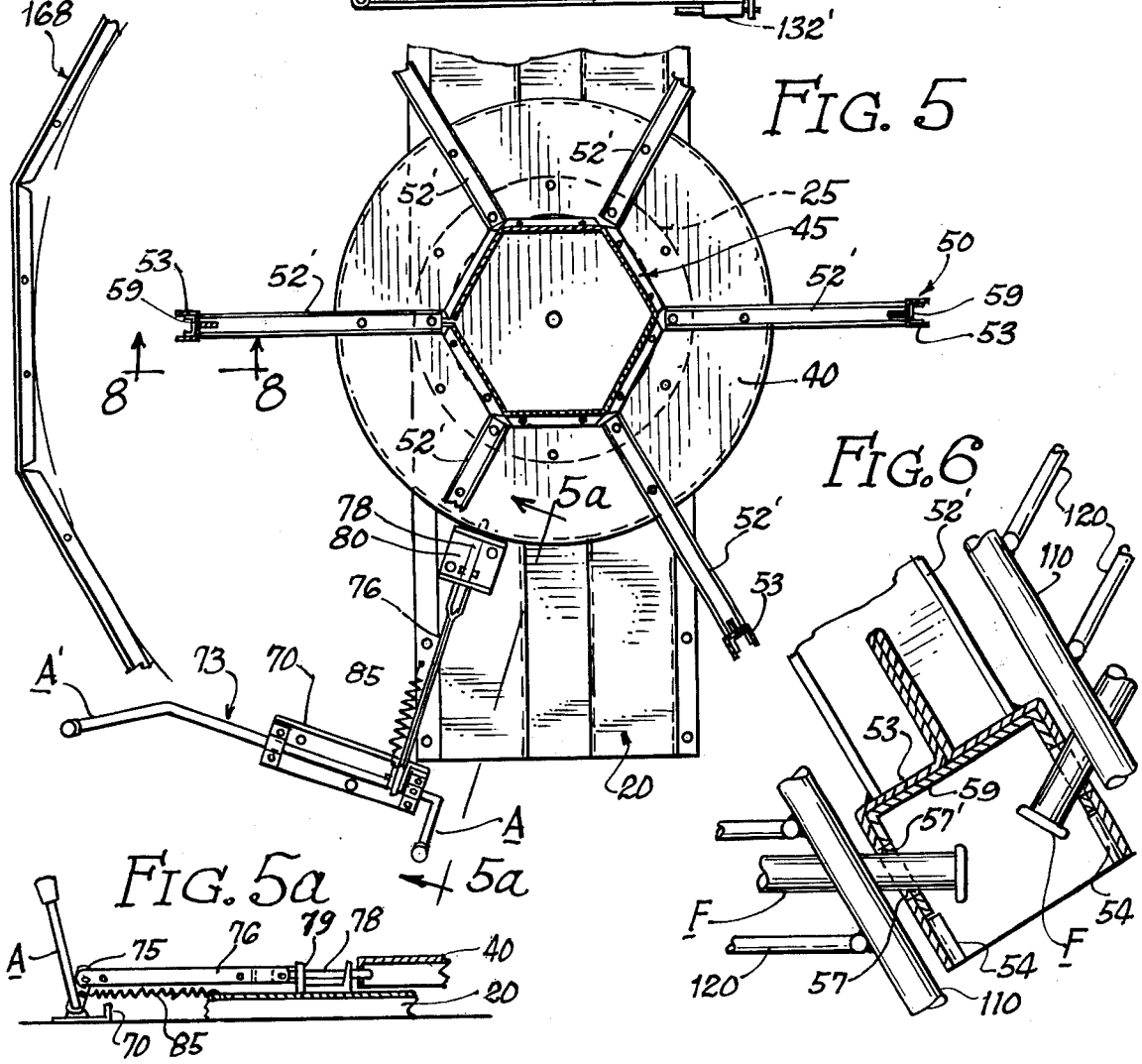

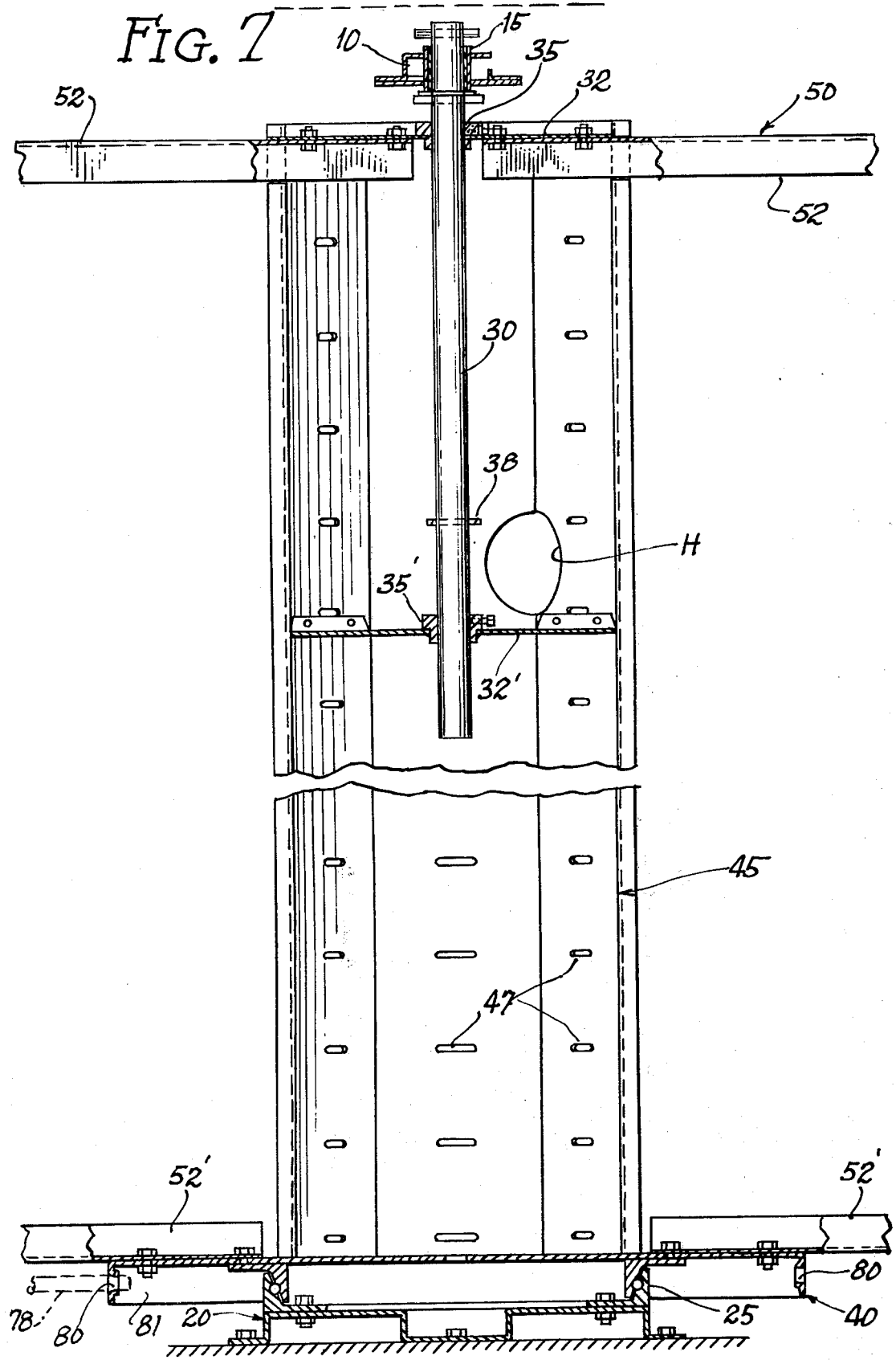

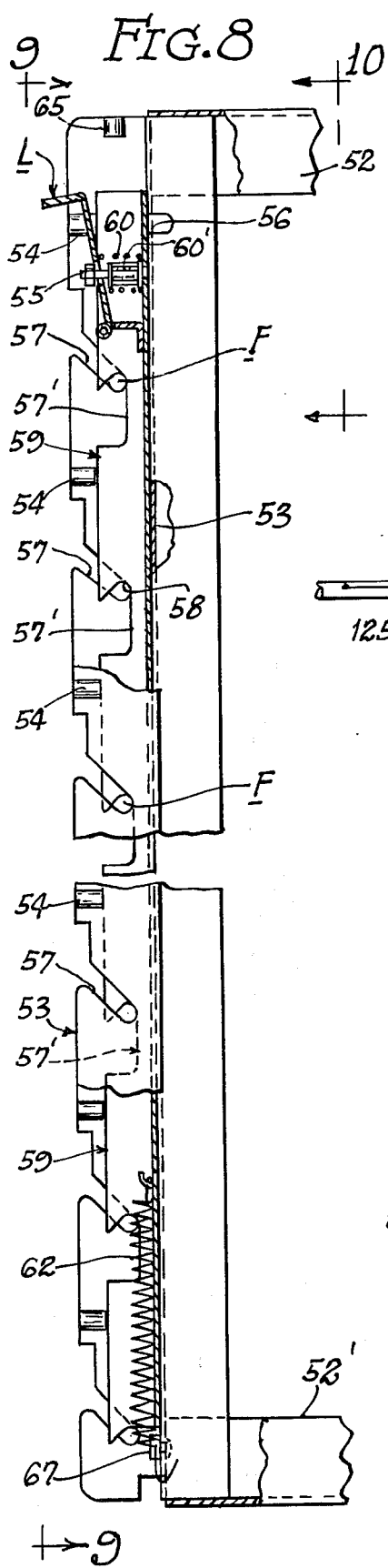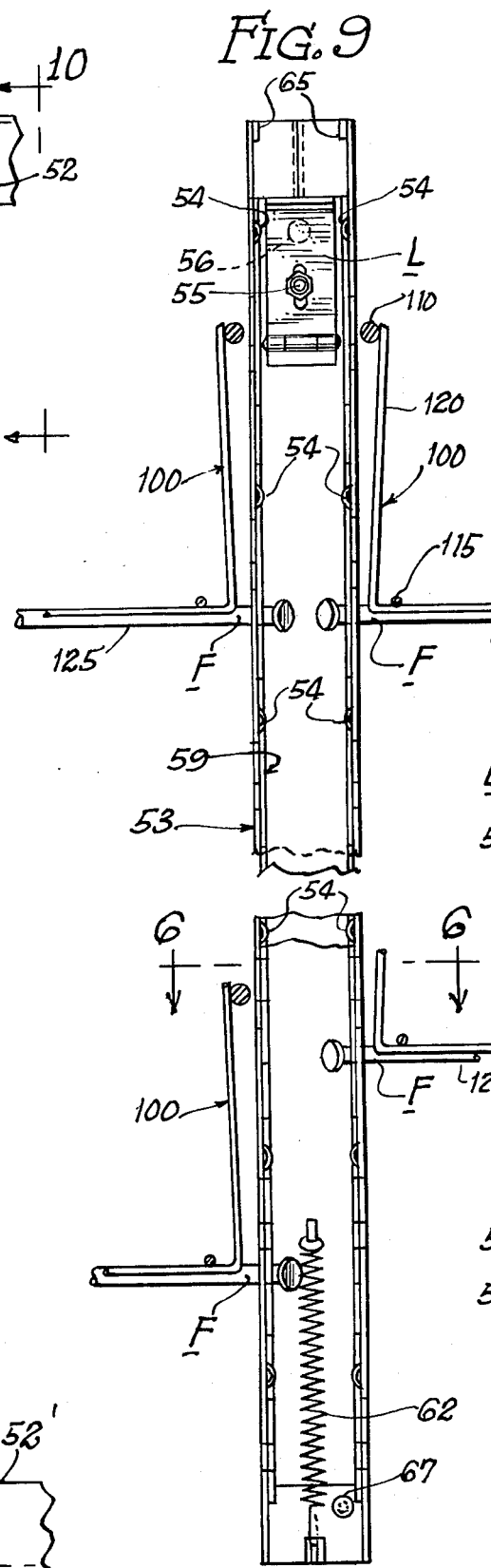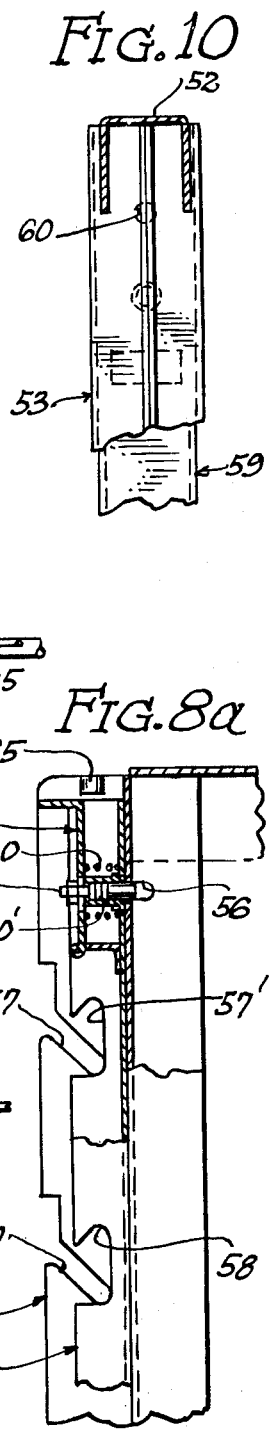

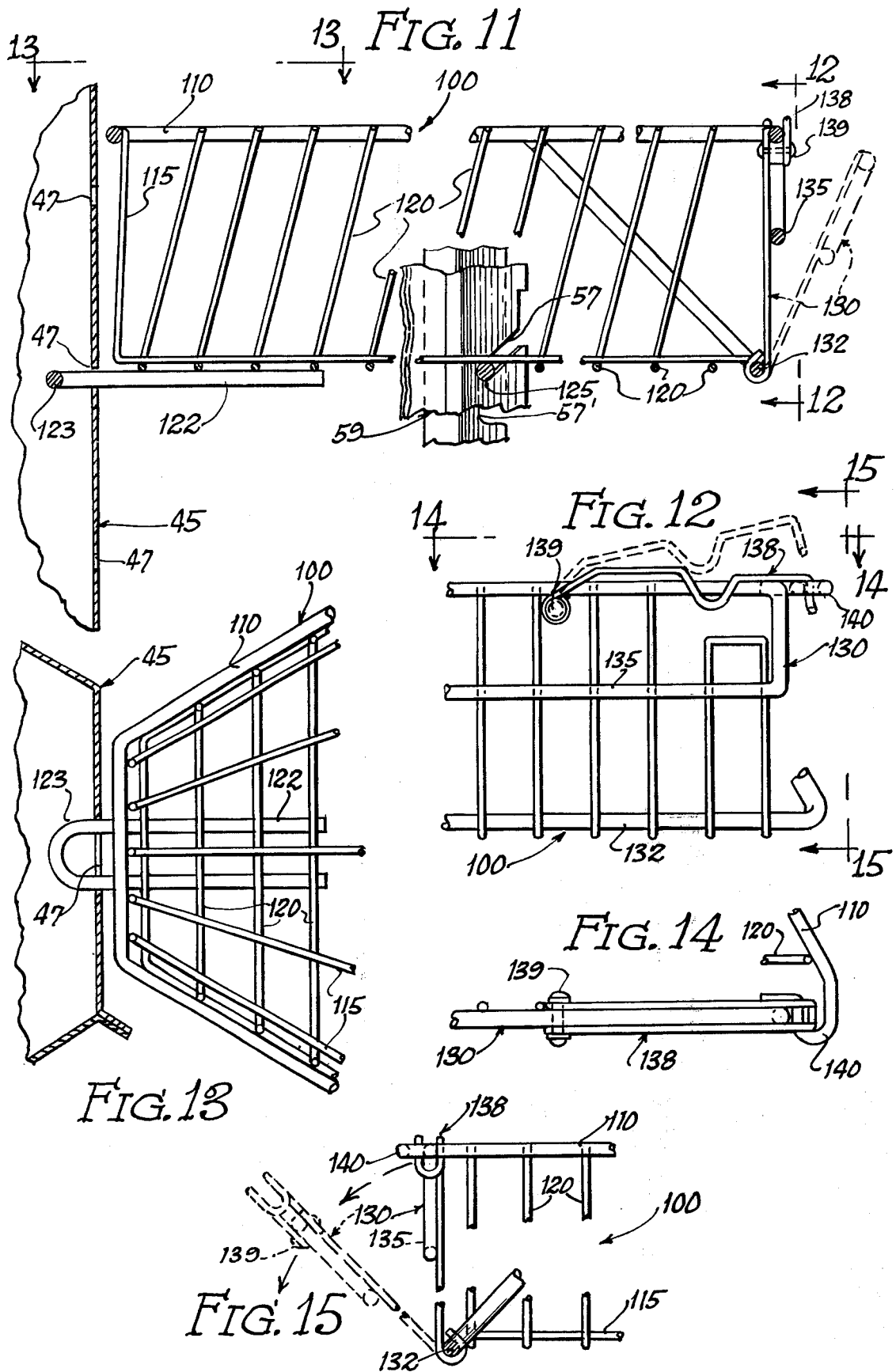

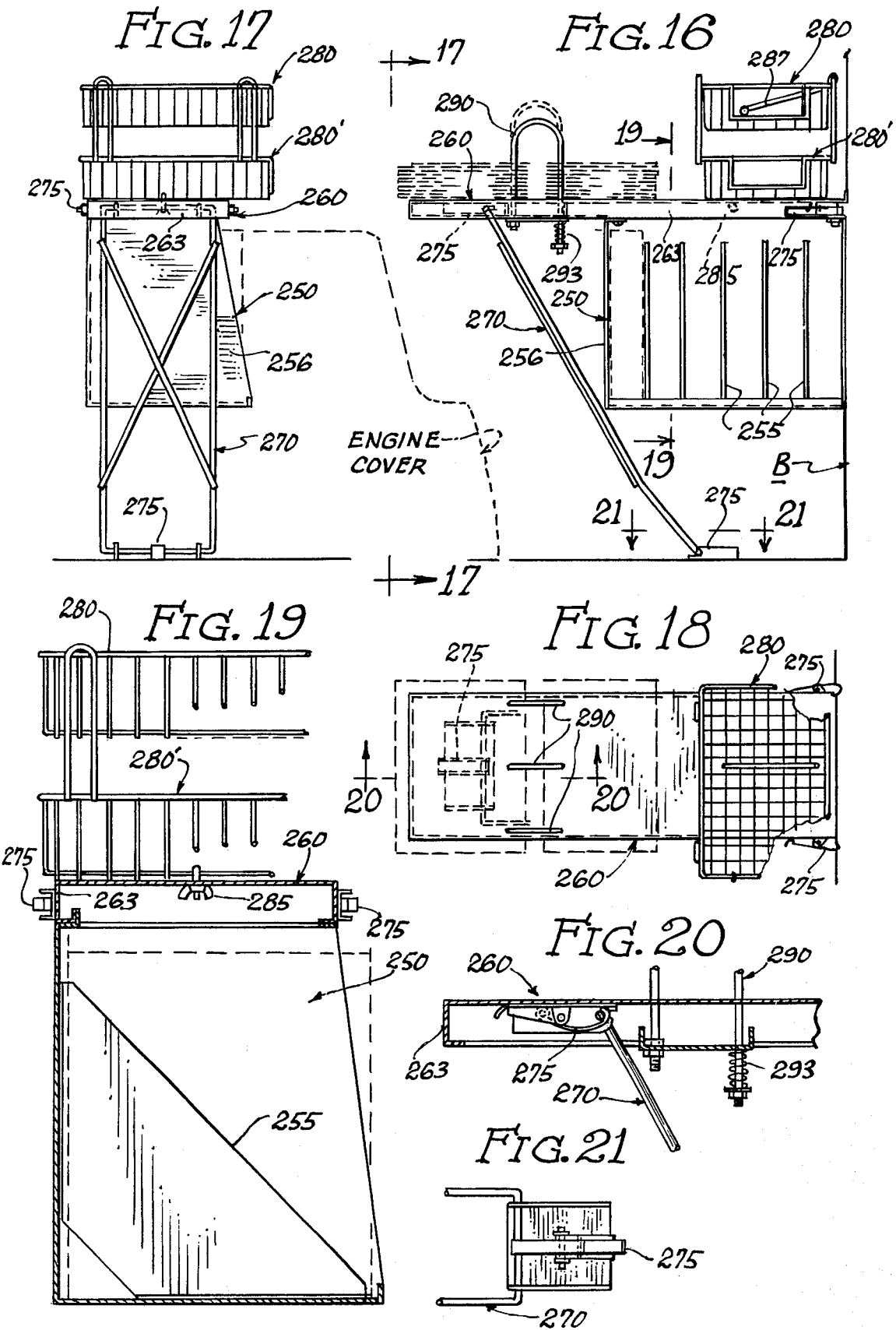

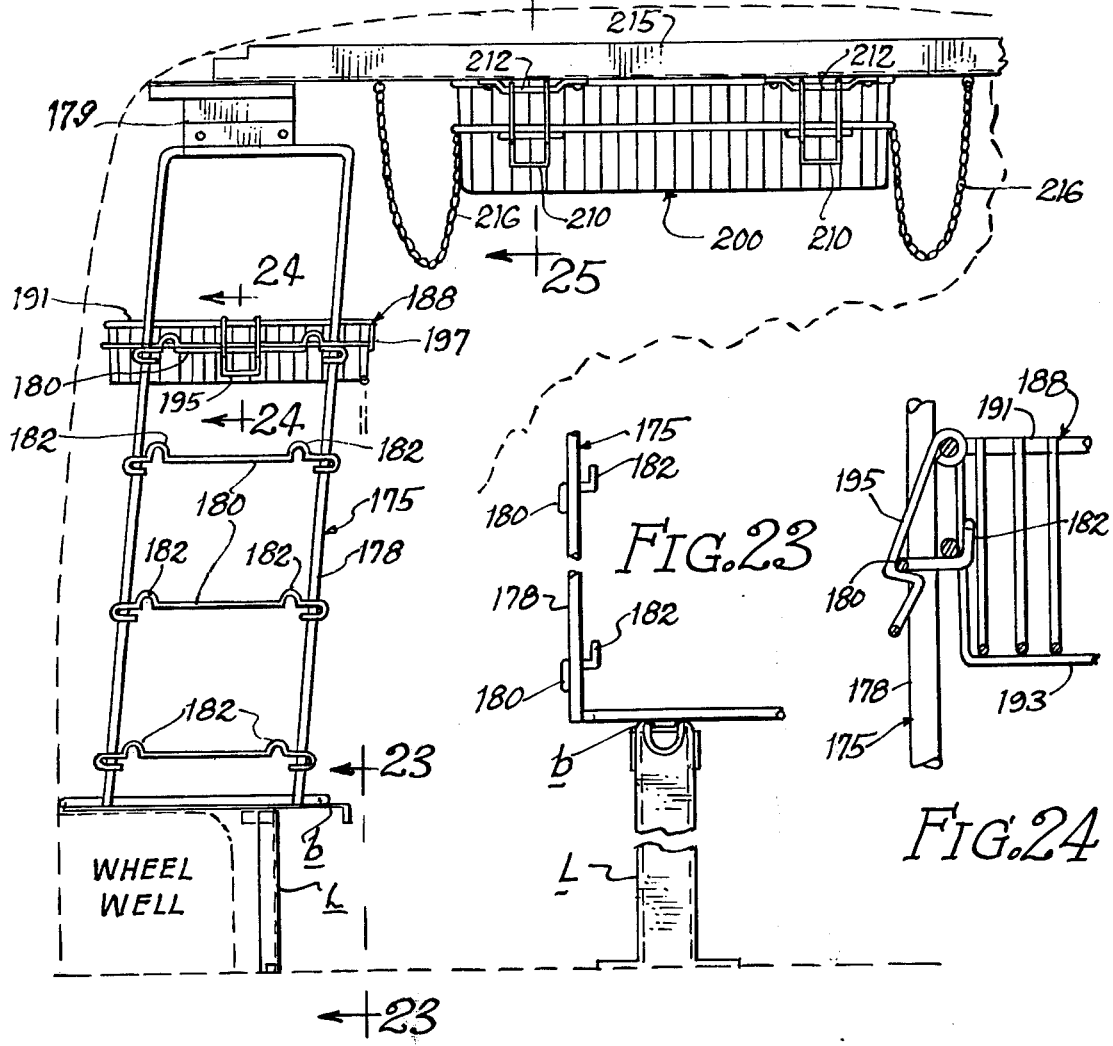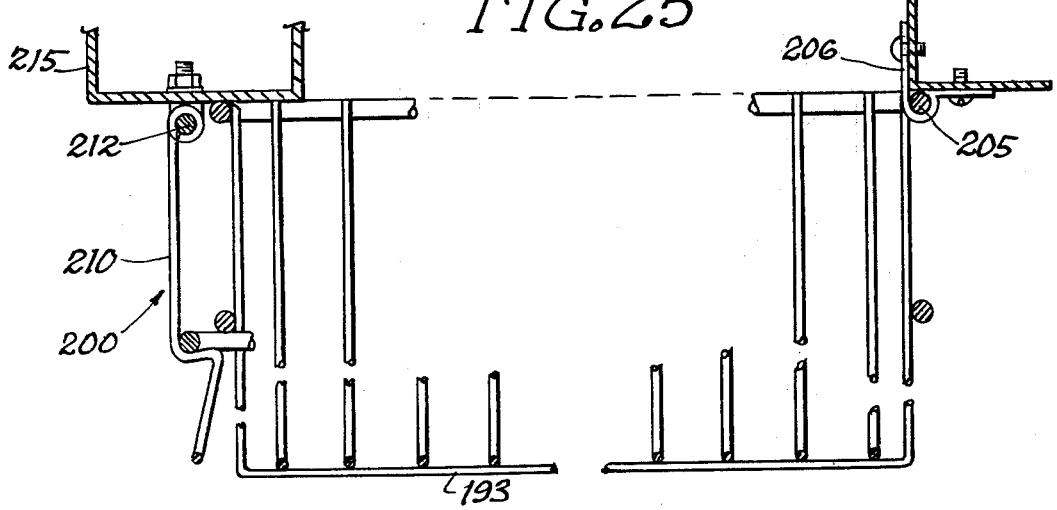

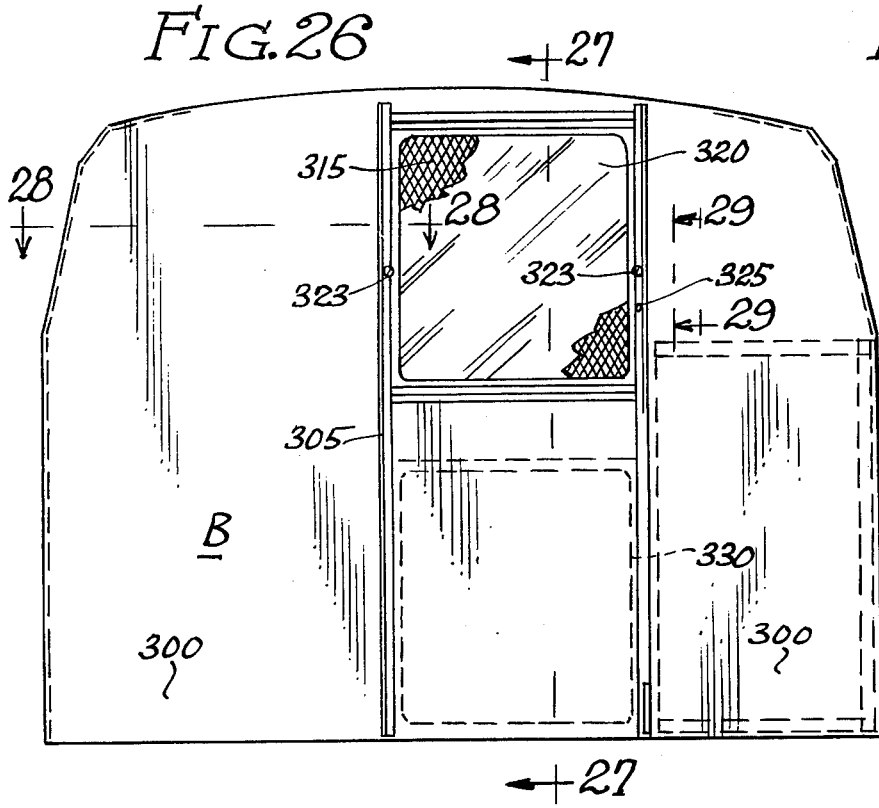
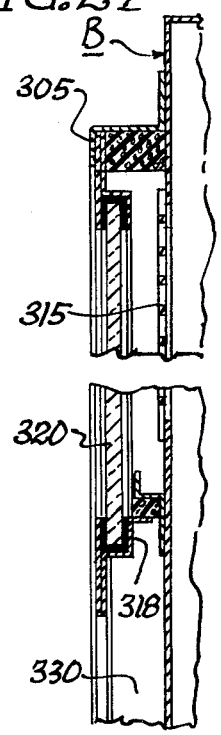
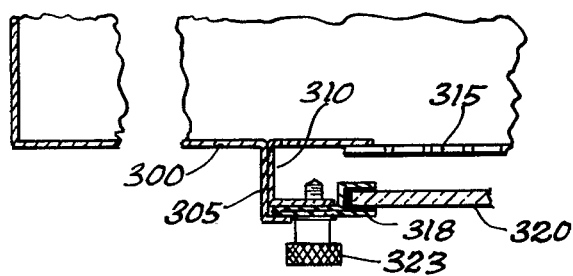
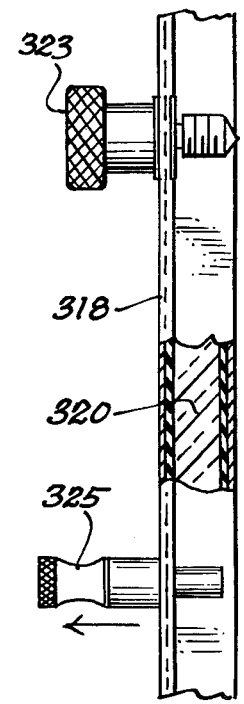
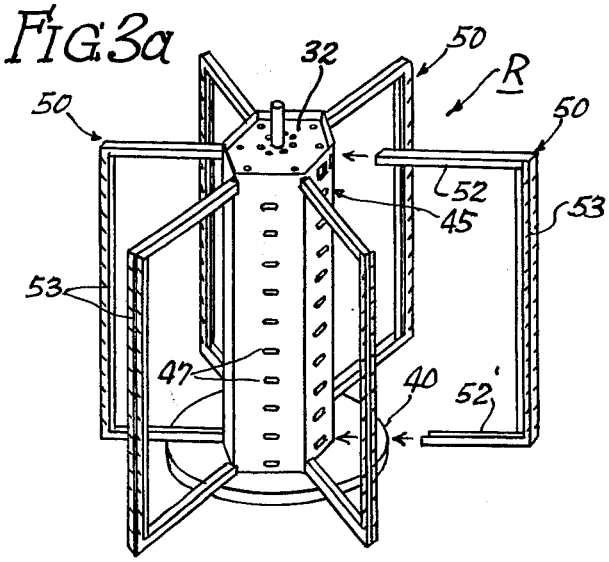

ROTARY STORAGE UNIT

This is a division of application Ser. No. 240,163, filed Mar. 31, 1972, and now U.S. Pat. No. 3,807,788.

My invention relates to service trucks in combination with equipment for housing and dispensing parts, tools, supplies and the like, including documentary material (eg., parts lists, service manuals, etc.), all as required by service men for household appliances such as washers, dryers, sewing machines, lawn mowers, garbage disposals, dishwashers, heating, cooling and air conditioning equipment, electronic devices such as radio and television receivers, phonographs and tape recorders, etc.

BACKGROUND OF THE INVENTION

It has been customary for service men to employ small standard trucks of the so-called panel type for transport of their tools and supplies which are stored in standard chests, cabinets or the like or disposed loosely in the truck body. The general lack of orderly arrangement and convenient access results in inefficiency and loss of time and hence unduly excessive expense, which must ultimately be borne by the customer.

BRIEF OUTLINE OF THE INVENTION

A prime object of my invention is to provide the service man with a fitted truck body designed and equipped to enable him to function at maximum efficiency and without the loss of time heretofore experienced.

To this end my invention contemplates a panel type truck body, of generally standard or special construction, in combination with storage and dispensing equipment of special design which may be quickly and easily installed or removed for repair or replacement, which equipment is readily accessible from outside the truck body.

Another object is to provide a rotary housing and dispensing device specially designed for installation in a truck body but usable elsewhere. Said rotary device, in a preferred embodiment, comprises a plurality of vertical sections each of which may have one or several removable containers locked in place but readily detachable. Said device may be manually rotated to provide access to any desired section and locked in such adjusted position.

Additional readily accessible storage and dispensing elements may be removably disposed on the sides and top of the truck body, thus efficiently utilizing the available space to maximum advantage.

Further improving the efficiency of the service man, special removable and readily accessible means is provided within the cab portion of the truck body for storage of documentary material such as parts lists, service manuals, orders, instructions and the like.

Still another object is to provide, in a combination of the type referred to, means more or less insulating the cab portion from the rear storage portion of the truck, and also dam means protecting the rotary storage device from the possibility of engagement with loose objects which slide along the floor while the truck is in transit.

A further object is to provide equipment of the type referred to which is specially designed for mass production, of knock down, simple construction which may be packed for shipment in small containers and may be quickly and easily installed and demounted with a minimum of simple tools, which will be rugged and inexpensive.

Various other objects and advantages will become apparent to those skilled in the art as the description proceeds.

BRIEF DESCRIPTION OF THE DRAWINGS

Referring now to the drawings forming a part of this specification and illustrating a preferred embodiment of my invention:

FIG. 1 is a simplified top plan view of a fitted truck body in a preferred embodiment of my invention;

FIG. 2 is a side elevation of said truck, with part of its walls broken away to reveal certain interior equipment;

FIG. 3 is a side elevational view of an embodiment of a rotary storage device constituting a feature of my invention;

FIG. 3a is a reduced scale perspective of the device seen in FIG. 3;

FIG. 4 is a fragmentary top plan of said unit;

FIG. 5 is a fragmentary plan-section, as seen substantially along line 5—5 of FIG. 3;

FIG. 5a is a section-elevation along line 5a—5a of FIG. 5;

FIG. 6 is an enlarged fragmentary section-elevation taken substantially along line 6—6 of FIG. 3;

FIG. 7 is an enlarged elevation-section taken substantially along line 7—7 of FIG. 4;

FIG. 8 is a fragmentary elevation-section, enlarged, along line 8—8 of FIG. 5, in container-locking condition;

FIG. 8a is a view similar to FIG. 8, unlocked;

FIG. 9 is a fragmentary elevation seen substantially along line 9—9 of FIG. 8;

FIG. 10 is a similar view seen substantially along line 10—10 of FIG. 8;

FIG. 11 is a similar view seen substantially along line 11—11 of FIG. 4, on an enlarged scale;

FIG. 12 is a similar view seen substantially along line 12—12 of FIG. 11;

FIG. 13 is a fragmentary plan-section substantially along line 13—13 of FIG. 11;

FIG. 14 is a fragmentary plan view seen substantially along line 14—14 of FIG. 12;

FIG. 15 is a fragmentary elevation seen substantially along line 15—15 of FIG. 12;

FIG. 16 is a side elevation of document supporting means disposed within the cab portion of the truck, pursuant to my invention;

FIG. 17 is an end elevation seen along line 17—17 of FIG. 16;

FIG. 18 is a top plan view of the equipment seen in FIG. 16;

FIG. 19 is a sectional view along line 19—19 of FIG. 16;

FIG. 20 is an enlarged section along line 20—20 of FIG. 18;

FIG. 21 is an enlarged plan detailing a floor attachment as seen along line 21—21 of FIG. 16;

FIG. 22 is an elevational view on an enlarged scale of a portion of the storage compartment of the truck body, showing certain storage equipment;

FIG. 23 is an enlarged fragmentary elevation seen along line 23—23 of FIG. 22;

FIG. 24 is a similar view seen along line 24—24 of FIG. 22;

FIG. 25 is an enlarged fragmentary section-elevation taken along line 25—25 of FIG. 22;

FIG. 26 is a rear elevation of a bulkhead separating the cab portion from the storage compartment;

FIG. 27 is a sectional view taken along line 27—27 of FIG. 26;

FIG. 28 is a fragmentary sectional view taken substantially along line 28—28 of FIG. 26, enlarged, and FIG. 29 is a further enlarged fragmentary elevation as seen along line 29—29 of FIG. 26.

DETAILED DESCRIPTION

Referring first to FIGS. 1 and 2, my invention contemplates specially equipping a truck body T which may be the body of a standard or modified panel truck designed to facilitate and expedite the functioning of service men, as outlined hereabove. It will be understood that my invention is otherwise applicable, as to the cabin of a nautical vessel, etc. In fact, various aspects of my invention are widely applicable, as in stationary installations, although specially designed for moving vehicles.

Truck body T comprises essentially two main compartments, viz, cab portion C and storage compartment S, said compartments being separated by a bulkhead B, preferably.

Removably mounted in compartment S is a plurality of storage and dispensing units, one of which is a knockdown rotary unit R constituting a major feature of my invention.

Rotary unit R comprises a skeleton frame mounted for rotation on a vertical axis and comprising a plurality of vertical sections, chambers or compartments radially disposed about the axis, each of such sections comprising one or more storage and dispensing receptacles. Said receptacles may vary in character but in any case are removably secured to said frame. The frame is mounted for angular adjustment and locking in any adjusted position to make accessible any desired section.

The storage means in any section may comprise any desired number of baskets, drawers, etc., stacked or vertically spaced and designed for quick and secure attachment to and detachment from the frame.

ROTARY UNIT

Referring to FIGS. 3–10, inclusive, suitable means is provided for detachably mounting unit R to the floor and ceiling of the truck body. While such mounting means may take a wide variety of forms, in this case I provide a channel like member 10 at the top and another channel like member 20 at the bottom of different configuration. Member 10 seats a suitable journal member 15 for a shaft 30, while member 20 seats a ring bearing indicated generally by numeral 25.

Arranged on shaft 30 are spaced bushings 35, 35' seating a pair of similar polygonal plates 32, 32', in this case hexagonal, although the plates could be circular or of other configuration. Shaft 30 may be provided with a cotter pin or other projection 38 to limit its accidental displacement.

A circular (or otherwise shaped) flanged base plate 40 secured to ring bearing 25 (FIG. 7) serves as a support for a column 45 which may conveniently be formed of a pair of similar sheet members secured together.

Plates 32, 32' are similar to the inside configuration of column 45 and are secured thereto. Said column is provided with peripherally spaced series of vertically spaced means 47 (in this case apertures) for supporting containers to be mounted on and carried by the column. A hand hole H may be provided in column 45 for access to the interior thereof.

Detachably secured to the column 45 is a series of radially extending U-members 50 comprising horizontal arms 52, 52' attached as by screws to upper and lower portions of the column (FIGS. 3a, 5, 7) and a vertical member or strut 53 of bilateral section, secured as by welding, to arms 52, 52'. A pair of adjacent U-members 50 defines the lateral extremities of a wedge shaped chamber or compartment the inner extremity of which is defined by the column.

Each vertical member 53 has a series of spaced diagonal notches 57 (FIGS. 3, 6, 8–10) which cooperate with a series of vertically elongated notches 57' in a U-bar 59 arranged to slide longitudinally within bar 53. Notches or slots 57 are inclined downwardly and inwardly while notches 57' (FIG. 8a) have a rounded cavity 58 at their upper end to seat a finger F of a container, to be described hereinafter.

A J-shaped pivoted latch L (FIGS. 8, 8a, 9) controls a detent 55 normally retaining the slide bar in unlocked position (FIG. 8a) by engagement in aperture 56. The latch is provided with a weak spring 60 and a strong spring 60' controling said detent.

When the latch is pivoted outwardly (FIG. 8), slide 59 will drop by gravity, assisted by coil spring 62, to locked position (FIGS. 8 and 9). To release a container or a series thereof in a given chamber, latch L is grasped by its outwardly projecting lip and the slide thus lifted, thereafter restoring the latch to the unlocked position (FIG. 8a).

Inwardly projecting bosses 65 limit the upward movement of slide bar 59 while a stop member 67 performs a like function at the lower end. Guide bosses 54 on bar 53 serve to guide and retain slide bar 59.

As seen in FIG. 1, the truck body may have access openings, preferably provided with doors D, at the rear and also adjacent the front of the storage compartment. Accordingly, it is desirable that I provide means for indexing and locking the rotary unit in any selected angular position to provide access to a selected chamber at a most convenient position.

Referring to FIGS. 5, 5a, an angle plate 70 pivotally mounts a U-shaped crank 73 on the truck bed. The crank (FIG. 5) is disposed obliquely to the longitudinal axis of the truck, whereby one arm A is disposed adjacent to a side door, the other arm A' being adjacent to the storage compartment. Crank 73 is connected by a link 75, through a connecting rod 76, to a plunger 78 supported by an apertured U-bar 79. Plunger 78 registers with any one of a series of holes 80 spaced about the periphery of circumferential flange 81 of base plate 40 (FIGS. 3, 5a, 7). A tension spring 85 (FIG. 5a) normally retains plunger 85 in locking engagement with the rotary unit.

From the above description it will be seen that a service man may have convenient access to the rotary unit either from the rear of the truck or from the opening at the side of the storage compartment. In either case he may conveniently make available any desired chamber of the unit after releasing locking means 73 by actuating the more convenient of crank handles A, A' and then rotating the unit to the proper position.

CONTAINER FOR ROTARY UNIT

While my improved rotary storage unit may carry a wide variety of containers of different designs, I have devised as a part of my invention an improved storage and dispensing basket which is especially advantageous.

Referring to FIGS. 11–15, numeral 100 indicates in general a container embodying my invention. While it may be formed of other materials, I have found plastic coated wire especially suitable as providing maximum visibility of contents as well as protection of fragile items. It is generally triangular or wedge shaped in horizontal configuration, for example, of isosceles trapezoidal outline, to conform to the radial compartments or chambers of the rotary member. Container 100 may comprise a top rim member 110 to which are attached spaced angular elements 115 forming back and bottom portions. Another series of wires 120 forms the sides and extend across the bottom. A U-shaped member 122 secured to the bottom has a rearwardly extending loop portion 123 engageable in an aperture 47 of column 45 to provide a rear support for the basket.

A transverse wire element 125, which should be of sufficiently heavy gauge to provide adequate support, is secured to and extends across the bottom (FIG. 11), projecting beyond the sides of the basket. The free ends of said wire 125 constitute support fingers F adapted to engage and be locked in notches 57, 57' of bars 53 and 59 and thus provide lateral support for the basket (FIGS. 6, 8, 8a, 9).

Although a lid might be provided, none is shown in this embodiment. Access may be provided from the front, a suitable gate 130 in this case being hingedly attached as at 132. The gate may take any suitable form, preferably having a crossbar 135, and also is provided with suitable latch members 138 on each side hinged as at 139 for clamping engagement with rim member 110, the latter being deformed to form a hook portion 140 to engage latch 138 (FIG. 14).

As seen in FIG. 4, various other types of containers may be carried by the rotary unit. For example, I may provide a tray 100A generally similar in configuration to container 100, to carry small, loose items. It may have a sheet bottom 145 and may have a pivoted gate 130 secured as by a sliding bolt or other suitable lock.

Another form of container mountable on the rotary frame may be a cabinet 150 of outwardly slidable drawers.

All of said containers are preferably detachably secured to the rotary frame as in the case of baskets 100, having finger elements engageable with the vertical bars, also means for detachable connection to the column, providing three point support.

STATIONARY STORAGE DEVICES

As seen in FIG. 1, available space within the storage portion S of the truck body is further utilized by provision of stationary storage and dispensing units 160, 160 disposed adjacent the side walls and a unit 165 supported by the roof. All of said units, like rotary unit R, are preferably of knockdown construction designed for easy mounting and detachment.

A suitable dam 168 (FIGS. 1 and 2) may be detachably secured to the floor extending across the truck bed rearwardly of rotary unit R to protect the latter from possible jamming as a result of contact with sliding objects. The dam need be only a few inches in height.

As seen in FIGS. 22–24, conveniently positioned adjacent a side wall is a frame 175 comprising legs L bolted to the floor, to which legs are attached transverse bars b defining the ends of the frame. Mounted on baas b is a pair of upstanding U-shaped wire members 178 secured to the roof as by straps 179 and spaced lengthwise of the truck.

Extending between the legs of each U-member 178 and fixed thereto as by brazing or welding is a series of vertically spaced horizontal container supports 180, preferably of wire. Said supports are provided with elements such as integral loops 182 for limiting movement of a basket 185, as hereinafter described in further detail.

The side containers may take a variety of forms. A preferred basket 188 formed of wire comprises a top rim element 191 having back and side members, the front being open. Wires secured to rim 191 form three sides and a bottom grid 193. A bail like clamp 195 hingedly attached to the side portions of rim 191 clampingly engages support wires 180, cooperating with loops 182 to limit outward and rearward displacement of the basket.

The front of the basket is provided with a gate member 197 pivoted at the bottom to drop and retained in closed position by any suitable means, which may be similar to that of baskets used with the rotary unit as described hereabove.

A ceiling container 200 may also be provided, a preferred form of which is seen in FIGS. 22 and 25, formed of wire and having four sides and a bottom of lattice form. Basket 200 may be pivotally attached by a rear rim portion 205 to a suitable bracket 206 on the roof of the truck body, the basket front being detachably connected by a bail 210 or the like pivotally attached as at 212 to a support 215 fixed to the roof. Downward displacement of basket 200 is limited by a flexible member 216 (FIG. 22).

It will be understood that other types of storage and dispensing units may be provided, such as chests, cabinets, etc. In any case such units should be secured against displacement in truck transit and arranged for convenient access and so disposed as to leave the central part of the storage portion of the truck body substantially free for entry by the service man. A cabinet 160A may be disposed near a side opening (FIG. 1).

From the above it is apparent that maximum use is made of the storage space over the wheel wells at the sides and adjacent the forward part of the roof while allowing space for a man in the center of the vehicle. Furthermore, straps (not shown) secured to the floor may provide for storage of additional parts or supplies.

DOCUMENT-LITERATURE STORAGE

As seen in FIGS. 16–21, my invention includes special knockdown and readily detachable equipment in the cab portion C of the truck body for storing and permitting ready access to a substantial volume of papers and literature and like material required by a service man in a day's operations, facilitating his work and adding to his efficiency.

Secured to the forward face of bulkhead B between seats S', S' (FIG. 1) for instant detachment is a box-like storage container 250 preferably, though not necessarily, formed of sheet material for housing ring binders, books such as catalogs and the like. Container 250 may have a plurality of compartments defined by vertical panels 255 and a front wall 256.

A horizontal panel 260 forms a top closure for container 250 and extends forwardly thereof, with downwardly extending flanges 263. Panel 260 is supported remotely from bulkhead B by a diagonal strut 270 which may conveniently be a U-shaped rod (FIGS. 16, 17) secured to the floor and to panel 260 for instant detachment. Such quick detachment means referred to herein may be the well known "trunk lock" 275 form of snap clamp or any other suitable device.

Disposed on panel 260 is a pair of stacked open-top trays or baskets 280, 280' of any suitable design for loose papers, preferably of wire and quickly detachable as by thumbscrews 285. A suitable bail or other suitable hold-down 287 prevents blowing away of loose papers.

Also arranged on panel 260 is means for supporting stacked sheets in fixed relation for ready access and punched for securement, such means comprising spaced upstanding wire U-members 290 (FIGS. 16, 18). Said wire members are detachably secured below the panel, resilient means 293 permitting their vertical movement for insertion or removal of papers.

It will be seen that I have provided in the cab literature storage means positioned for convenient use and adapted to be quickly set up and instantly taken down to permit access to operating parts of the vehicle.

BULKHEAD

A bulkhead B, while not indispensable, is a desirable feature of my invention from the standpoint of economy of operation, particularly with regard to heating and air conditioning of the cab. It also protects persons within the cab from possible flying objects on a sudden stop. A retractable window in the bulkhead permits air passage between the compartments in mild weather.

FIGS. 26–29 show a preferred embodiment of bulkhead which may take a variety of forms, extending transversely across the vehicle body effectively to separate the cab and cargo portions. The bulkhead may conveniently be formed of sheet sections 300 flanged for assembly and attachment to the truck body as by screws.

A J-shaped flange portion 305 seats a U-shaped frame 310 to which is fixed a wire grille or screen 315 in an open upper part of the bulkhead.

A glass pane 320 carried by a frame member 318 is seated within frame 310 rearwardly of grille 315 for vertical sliding movement and may be retained in up or closed position as by a captive screw 323 and a spring pressed detent 325 (FIG. 29) or other suitable means. The window when released drops into a cavity 330 (FIG. 27).

CONCLUSION

It will be apparent that I have provided an improved combination of a service truck with storage and dispensing devices which will greatly add to the efficiency of a service man. It is estimated that my invention will enable a man to make at least two or three more service calls per day than with equipment now known, effecting substantial economies which will inure to the benefit of the customer.

Various changes coming within the spirit of my invention may suggest themselves to those skilled in the art. Hence, I do not wish to be limited to the specific forms shown or uses mentioned herein, except to the extent indicated in the appended claims.

I claim:

1. A rotary storage and dispensing unit, comprising,
   a. a column provided with a plurality of radially spaced vertical rows of supporting seats,
   b. means mounting said column for rotary movement about its vertical axis,
   c. a frame consisting of pairs of vertically aligned beams extending radially from said column, in displaced relation to said vertical rows of seats, adjacent its top and bottom with a vertical strut bridging the upper and lower extremities of each pair of aligned beams for defining radial wedge-shaped compartments,
   d. each of said struts being of channel cross-section with sides having downwardly inclined slots extending from the free edges thereof leading to supporting seats in said sides at superposed levels corresponding to said first-mentioned seats in said column,
   e. wedge-shaped containers detachably mounted within said compartments, said containers having rearwardly and laterally extending projections engageable, respectively, with the seats in the column and struts, to provide three-point container support,
   f. each of said slots adapted to selectively receive the terminal end of one of said laterally extending projections for supporting the containers at different levels, and
   g. locking means for said terminal ends comprising a channel member with bilateral sides mounted for reciprocating movement within each strut, said bilateral sides having notches at the free edges thereof cooperative with said inclined slots for detachably locking said lateral projections to said frame.

2. A rotary storage and dispensing unit, comprising
   a. a column,
   b. means mounting said column for rotary movement about its vertical axis,
   c. a frame consisting of pairs of vertically aligned beams extending radially from said column adjacent its top and bottom with a vertical strut bridging the upper and lower extremities of each pair of aligned beams for defining radial wedge-shaped compartments, with supporting seats in said column and struts, respectively, and
   d. wedge-shaped containers detachably mounted within said compartments, said containers having rearwardly and laterally extending projections engageable, respectively, with the seats in the column and struts, to provide three-point container support,
   e. the vertically aligned beams and the bridging strut therebetween forming an open framework which defines the radial wedge-shaped compartments, said strut being a plate-like member having oblique, downwardly extending slots forming seats for said laterally extending container projections,
   f. said plate-like member being of bilateral section with said oblique slots in each side of said member, for receiving the laterally extending projections of the containers in adjacent compartments at selected levels, in direct interlocking engagement with said strut.

3. A device as set forth in claim 2, wherein said containers comprise a wire basket of generally triangular outline in horizontal section, with the projections being formed of wire for direct and positive support of said basket within said seats.

4. A device as set forth in claim 3, wherein the laterally extending wire projections are terminal ends of a bar extending across a widened portion of said basket and through said inclined slots in the facing lateral sides of the two adjacent struts defining the compartment receiving said wire basket, and locking means movable longitudinally in each strut for locking said terminal ends within said seats therein.

5. A device as set forth in claim 2, wherein said containers comprise a tray for the retention of small articles with the narrowed portion at the rearward end thereof in detachable engagement with the seat in the column, and with the laterally extending projections engageable with said downwardly inclined slots and seats in the lateral sides of adjacent vertical struts.

6. A device as set forth in claim 1, including means for reciprocally moving each channel member vertically in its companion strut, and latching means for fixing said channel means in position of alignment of said slots and notches, to permit the free movement of the terminal ends therein, preparatory to the vertical movement of said channel member to effect the detachable locking of said lateral projections in said slots.

7. A device as set forth in claim 1, wherein each channel member is spring loaded to assist the effect of gravity.

8. A rotary storage and dispensing unit, comprising a. a column rotatably mounted on a vertical axis and having a plurality of vertically spaced container supporting elements, b. a skeletal frame carried by said column consisting of vertically spaced pairs of horizontal beams secured to said column, said pairs being circumferentially spaced about said column and providing a plurality of generally triangular radial chambers, c. a vertical strut connecting each pair of beams at points remote from said column, each strut having container supporting means corresponding in elevation to the supporting elements of said column, providing three-point support for a container disposed within the chamber, d. a container detachably carried by said frame, and e. manually operated remotely controled means indexing said frame at predetermined angular positions, f. said last mentioned indexing means comprising an annular flange at the base of said unit provided with a plurality of openings therein of at least as great a number as the radial chambers, a spring loaded slidable bolt for selectively engaging one of said openings, and actuating means connected to said bolt comprising two spaced manually operated levers.

* * * * *